US012810222B2

(12) United States Patent
Hirakawa et al.

(10) Patent No.: US 12,810,222 B2
(45) Date of Patent: Nov. 24, 2026

(54) WORK TIME PREDICTION DEVICE, SERVER DEVICE, TERMINAL DEVICE, WORK TIME PREDICTION METHOD, AND STORAGE MEDIUM

(71) Applicant: HONDA MOTOR CO., LTD., Tokyo (JP)

(72) Inventors: Megumi Hirakawa, Tokyo (JP); Satoshi Murata, Tokyo (JP); Sota Sakaguchi, Tokyo (JP); Shohei Namiki, Tokyo (JP); Ryota Hisada, Tokyo (JP); Ryuichi Kimata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/536,886

(22) Filed: Dec. 12, 2023

(65) Prior Publication Data

US 2024/0112109 A1 Apr. 4, 2024

Related U.S. Application Data

(63) Continuation of application No. PCT/JP2021/022666, filed on Jun. 15, 2021.

(51) Int. Cl.
*G06Q 10/06* (2023.01)
*G06Q 10/0631* (2023.01)

(52) U.S. Cl.
CPC .............................. *G06Q 10/06314* (2013.01)

(58) Field of Classification Search
CPC ...................................................... G06Q 10/06
See application file for complete search history.

(56) References Cited

U.S. PATENT DOCUMENTS 8,126,819 B1 2/2012 Ersek
8,875,088 B1 10/2014 Holler et al.
2005/0004805 A1* 1/2005 Srinivasan ......... G06Q 30/0631 705/26.7
2015/0095268 A1* 4/2015 Greenzeiger .... G06Q 10/06311 706/11
2015/0161555 A1* 6/2015 Cui ................ G06Q 10/063118 705/7.17

(Continued)

FOREIGN PATENT DOCUMENTS

JP 2009-031992 A 2/2009
JP 2009-118823 A 6/2009

(Continued)

OTHER PUBLICATIONS

Extended (Supplementary) European Search Report dated May 15, 2024, issued in counterpart EP Application No. 21945939.3. (8 pages).

(Continued)

*Primary Examiner* — Kurtis Gills
(74) *Attorney, Agent, or Firm* — WHDA, LLP

(57) ABSTRACT

The acquisition unit acquires area information regarding a current work area. The prediction unit predicts a work time in the current work area on the basis of the area information acquired by the acquisition unit and history information in which area information regarding a past work area and time information regarding a work time in the past work area are associated with each other.

20 Claims, 13 Drawing Sheets

1021

| AREA ID | DIVISION ID | WORK DIVISION | SIZE ($m^2$) | COEFFICIENTS | | | | | SIZE x COEFFICIENT | FUEL CONSUMPTION AMOUNT (L) | NUMBER OF WORKERS | NUMBER OF WORKING MACHINES | ACTUAL WORK TIME (min) | ACTUAL COST |
|---|---|---|---|---|---|---|---|---|---|---|---|---|---|---|
| | | | | INCLINATION | WATERSIDE | OBJECT | PLANT | TOTAL | | | | | | |
| 0001 | A0001 | LAWN | 500 | 1.2 | 1 | 1.5 | 1 | 1.8 | 900 | 30 | 1 | 1 | 40 | X1 |
| | B0001 | GRASS | 600 | 1.5 | 1.1 | 1 | 1 | 1.65 | 990 | 33 | 2 | 2 | 30 | |
| | C0001 | HANDHELD | 100 | 1 | 1 | 2 | 1 | 2 | 200 | 10 | 1 | 1 | 45 | |
| | D0001 | HEDGE | 150 | 1 | 1 | 1 | 2 | 2 | 300 | 15 | 1 | 1 | 50 | |
| 0002 | A0002 | LAWN | 600 | 1 | 1.2 | 1 | 1 | 1.2 | 720 | 24 | 1 | 1 | 30 | X2 |
| | B0002 | GRASS | 200 | 1.2 | 1 | 1.5 | 1 | 1.8 | 360 | 12 | 2 | 2 | 15 | |
| | C0002 | HANDHELD | 150 | 1 | 1 | 1 | 1.5 | 1.5 | 225 | 13 | 1 | 1 | 45 | |
| | D0002 | HEDGE | 100 | 1 | 1 | 1.2 | 1 | 1.2 | 120 | 6 | 1 | 1 | 20 | |

(56) References Cited

U.S. PATENT DOCUMENTS

| | | | |
|---|---|---|---|
| 2015/0163993 | A1 | 6/2015 | Pettersson |
| 2016/0321551 | A1* | 11/2016 | Priness .................. G06N 5/047 |
| 2017/0349058 | A1 | 12/2017 | Bernier et al. |
| 2019/0138963 | A1* | 5/2019 | El Saban ......... G06Q 10/06314 |
| 2019/0213509 | A1* | 7/2019 | Burleson ................ G06N 20/00 |
| 2019/0373101 | A1* | 12/2019 | Dotan-Cohen .. G06Q 10/06314 |
| 2020/0046193 | A1 | 2/2020 | Chae |
| 2020/0210965 | A1* | 7/2020 | Garber ................... G06Q 10/04 |
| 2020/0234219 | A1 | 7/2020 | Namba et al. |
| 2020/0411170 | A1* | 12/2020 | Brown ................... G06N 20/00 |
| 2022/0066456 | A1* | 3/2022 | Ebrahimi Afrouzi ........................ G06F 3/04883 |
| 2022/0156662 | A1 | 5/2022 | Pickreign |
| 2022/0413165 | A1 | 12/2022 | Song |
| 2023/0204372 | A1* | 6/2023 | Xu ....................... G08G 1/0112 |

FOREIGN PATENT DOCUMENTS

| | | |
|---|---|---|
| JP | 2020-119166 A | 8/2020 |
| WO | 2020/136811 A1 | 7/2020 |
| WO | 2020/136812 A1 | 7/2020 |

OTHER PUBLICATIONS

International Search Report dated Sep. 21, 2021, issued in counterpart International Application No. PCT/JP2021/022666, with English Translation. (5 pages).

Written Opinion of the International Searching Authority (Form PCT/ISA/237) dated Sep. 21, 2021, issued in counterpart International Application No. PCT/JP2021/022666. (3 pages).

International Search Report dated Sep. 14, 2021, issued in counterpart International Application No. PCT/JP2021/022667, with English Translation. (5 pages).

Written Opinion of the International Searching Authority (Form PCT/ISA/237) dated Sep. 14, 2021, issued in counterpart International Application No. PCT/JP2021/022667. (3 pages).

Related co-pending U.S. Appl. No. 18/536,850.

Office Action dated Jul. 12, 2024, issued in counterpart JP application No. 2023-528799, with English translation. (8 pages).

Non-Final Office Action dated Feb. 12, 2026, issued in U.S. Appl. No. 18/536,850. (43 pages).

Final Office Action dated Jul. 1, 2026, issued in U.S. Appl. No. 18/536,850 (23 pages).

Non-Final Office Action dated Oct. 6, 2026, issued in U.S. Appl. No. 18/536,850. (17 pages).

* cited by examiner

FIG. 3

1021

| AREA ID | DIVISION ID | WORK DIVISION | SIZE ($m^2$) | COEFFICIENTS | | | | | SIZE x COEFFICIENT | FUEL CONSUMPTION AMOUNT (L) | NUMBER OF WORKERS | NUMBER OF WORKING MACHINES | ACTUAL WORK TIME (min) | ACTUAL COST |
|---|---|---|---|---|---|---|---|---|---|---|---|---|---|---|
| | | | | INCLINATION | WATER-SIDE | OBJECT | PLANT | TOTAL | | | | | | |
| 0001 | A0001 | LAWN | 500 | 1.2 | 1 | 1.5 | 1 | 1.8 | 900 | 30 | 1 | 1 | 40 | X1 |
| | B0001 | GRASS | 600 | 1.5 | 1.1 | 1 | 1 | 1.65 | 990 | 33 | 2 | 2 | 30 | |
| | C0001 | HANDHELD | 100 | 1 | 1 | 2 | 1 | 2 | 200 | 10 | 1 | 1 | 45 | |
| | D0001 | HEDGE | 150 | 1 | 1 | 1 | 2 | 2 | 300 | 15 | 1 | 1 | 50 | |
| 0002 | A0002 | LAWN | 600 | 1 | 1.2 | 1 | 1 | 1.2 | 720 | 24 | 1 | 1 | 30 | X2 |
| | B0002 | GRASS | 200 | 1.2 | 1 | 1.5 | 1 | 1.8 | 360 | 12 | 2 | 2 | 15 | |
| | C0002 | HANDHELD | 150 | 1 | 1 | 1 | 1.5 | 1.5 | 225 | 13 | 1 | 1 | 45 | |
| | D0002 | HEDGE | 100 | 1 | 1 | 1.2 | 1 | 1.2 | 120 | 6 | 1 | 1 | 20 | |

FIG. 5

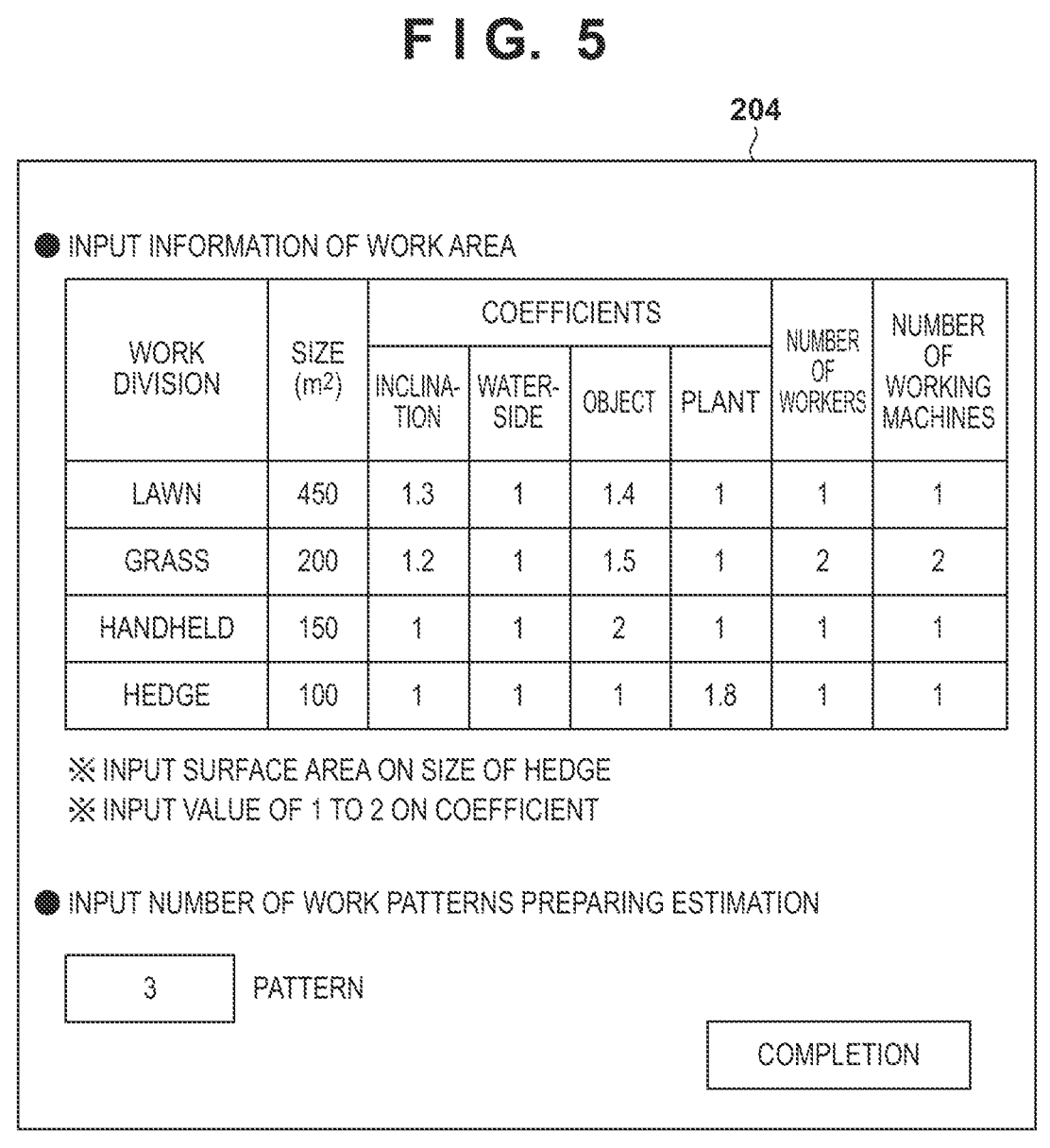

204

● INPUT INFORMATION OF WORK AREA

| WORK DIVISION | SIZE ($m^2$) | COEFFICIENTS | | | | NUMBER OF WORKERS | NUMBER OF WORKING MACHINES |
|---|---|---|---|---|---|---|---|
| | | INCLINATION | WATER-SIDE | OBJECT | PLANT | | |
| LAWN | 450 | 1.3 | 1 | 1.4 | 1 | 1 | 1 |
| GRASS | 200 | 1.2 | 1 | 1.5 | 1 | 2 | 2 |
| HANDHELD | 150 | 1 | 1 | 2 | 1 | 1 | 1 |
| HEDGE | 100 | 1 | 1 | 1 | 1.8 | 1 | 1 |

※ INPUT SURFACE AREA ON SIZE OF HEDGE

※ INPUT VALUE OF 1 TO 2 ON COEFFICIENT

● INPUT NUMBER OF WORK PATTERNS PREPARING ESTIMATION

[ 3 ] PATTERN

[ COMPLETION ]

FIG. 6

ESTIMATION RESULT

● PATTERN 1

| WORK DIVISION | NUMBER OF WORKERS | NUMBER OF WORKING MACHINES | PREDICTION WORK TIME (min) | ESTIMATE AMOUNT |
|---|---|---|---|---|
| LAWN | 1 | 1 | 36 | 50min × 5 PEOPLE = 250min<br>FUEL CONSUMPTION AMOUNT = 63L<br>COST : M1 YEN |
| GRASS | 2 | 2 | 30 | |
| HANDHELD | 1 | 1 | 45 | |
| HEDGE | 1 | 1 | 50 | |

● PATTERN 2

| WORK DIVISION | NUMBER OF WORKERS | NUMBER OF WORKING MACHINES | PREDICTION WORK TIME (min) | ESTIMATE AMOUNT |
|---|---|---|---|---|
| LAWN | 1 | 1 | 36 | 60min × 4 PEOPLE = 240min<br>FUEL CONSUMPTION AMOUNT = 63L<br>COST : M2 YEN |
| GRASS | 1 | 1 | 60 | |
| HANDHELD | 1 | 1 | 45 | |
| HEDGE | 1 | 1 | 50 | |

● PATTERN 3

| WORK DIVISION | NUMBER OF WORKERS | NUMBER OF WORKING MACHINES | PREDICTION WORK TIME (min) | ESTIMATE AMOUNT |
|---|---|---|---|---|
| LAWN | 2 | 2 | 18 | 30min × 8 PEOPLE = 240min<br>FUEL CONSUMPTION AMOUNT = 63L<br>COST : M3 YEN |
| GRASS | 2 | 2 | 30 | |
| HANDHELD | 2 | 2 | 25 | |
| HEDGE | 2 | 2 | 25 | |

FIG. 8

| DIVISION ID | WORK DIVISION | SIZE ($m^2$) | COEFFICIENTS | | | | | SIZE × COEFFICIENT | FUEL CONSUMPTION AMOUNT (L) | NUMBER OF WORKERS | NUMBER OF WORKING MACHINES | ACTUAL WORK TIME (min) |
|---|---|---|---|---|---|---|---|---|---|---|---|---|
| | | | INCLINATION | WATERSIDE | OBJECT | PLANT | TOTAL | | | | | |
| A0001 | LAWN | 500 | 1.2 | 1 | 1.5 | 1 | 1.8 | 900 | 30 | 1 | 1 | 40 |
| A0002 | LAWN | 600 | 1 | 1.2 | 1 | 1 | 1.2 | 720 | 24 | 1 | 1 | 30 |
| A0003 | LAWN | 1000 | 1 | 1.2 | 1 | 1 | 1.2 | 1200 | 40 | 2 | 2 | 25 |

FIG. 12

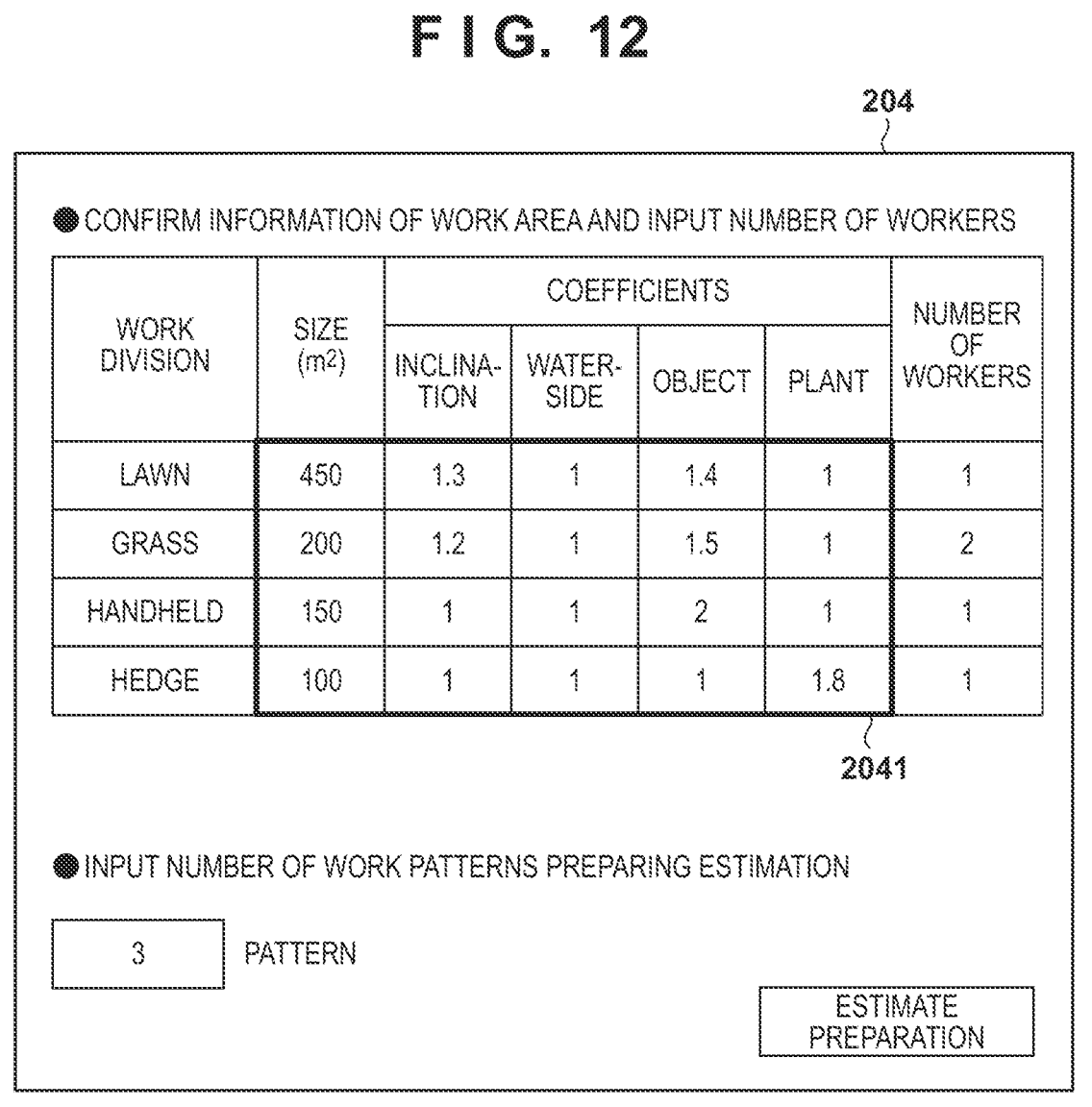

204

● CONFIRM INFORMATION OF WORK AREA AND INPUT NUMBER OF WORKERS

| WORK DIVISION | SIZE ($m^2$) | COEFFICIENTS | | | | NUMBER OF WORKERS |
|---|---|---|---|---|---|---|
| | | INCLINATION | WATER-SIDE | OBJECT | PLANT | |
| LAWN | 450 | 1.3 | 1 | 1.4 | 1 | 1 |
| GRASS | 200 | 1.2 | 1 | 1.5 | 1 | 2 |
| HANDHELD | 150 | 1 | 1 | 2 | 1 | 1 |
| HEDGE | 100 | 1 | 1 | 1 | 1.8 | 1 |

2041

● INPUT NUMBER OF WORK PATTERNS PREPARING ESTIMATION

3 PATTERN

ESTIMATE PREPARATION

WORK TIME PREDICTION DEVICE, SERVER DEVICE, TERMINAL DEVICE, WORK TIME PREDICTION METHOD, AND STORAGE MEDIUM

CROSS-REFERENCE TO RELATED APPLICATION(S)

This application is a continuation of International Patent Application No. PCT/JP2021/022666 filed on Jun. 15, 2021, the entire disclosures of which is incorporated herein by reference.

BACKGROUND OF THE INVENTION

Field of the Invention

The present invention relates to a work time prediction device, a server device, a terminal device, a work time prediction method, and a storage medium.

Description of the Related Art

In parks, gardens, and the like, work such as lawn mowing or grass mowing may be performed by a landscaper. The landscaper performs the work using a device such as a lawn mower (for example, Patent Literature 1), a trimmer, or a blower, or manually.

CITATION LIST

Patent Literature

PTL1: Japanese Patent Laid-Open No. 2009-118823

When the landscaper receives a request for work from a requester, the landscaper may observe an area of a work target to predict a work time, and may estimate a work cost or the like on the basis of the predicted work time. Therefore, it is desired to improve the prediction accuracy of the work time in order to perform appropriate estimation.

SUMMARY OF THE INVENTION

The present invention provides technology for appropriately predicting a work time.

According to one aspect of the present invention, there is provided a work time prediction device, comprising:

- an acquisition unit configured acquire area information regarding a current work area; and
- a prediction unit configured predict a work time in the current work area on the basis of the area information acquired by the acquisition unit and history information in which area information regarding a past work area and time information regarding a work time in the past work area are associated with each other.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a diagram illustrating an example of data stored in a storage unit.

FIG. 5 is a diagram illustrating a screen example of a display unit at the time of receiving input of area information.

FIG. 6 is a diagram illustrating a screen example of a display unit related to a predicted work time and an estimation.

FIG. 8 is a diagram illustrating past information regarding a lawn.

FIG. 12 is a diagram illustrating a screen example of the display unit at the time of receiving input of area information.

DESCRIPTION OF THE EMBODIMENTS

Figure 1:
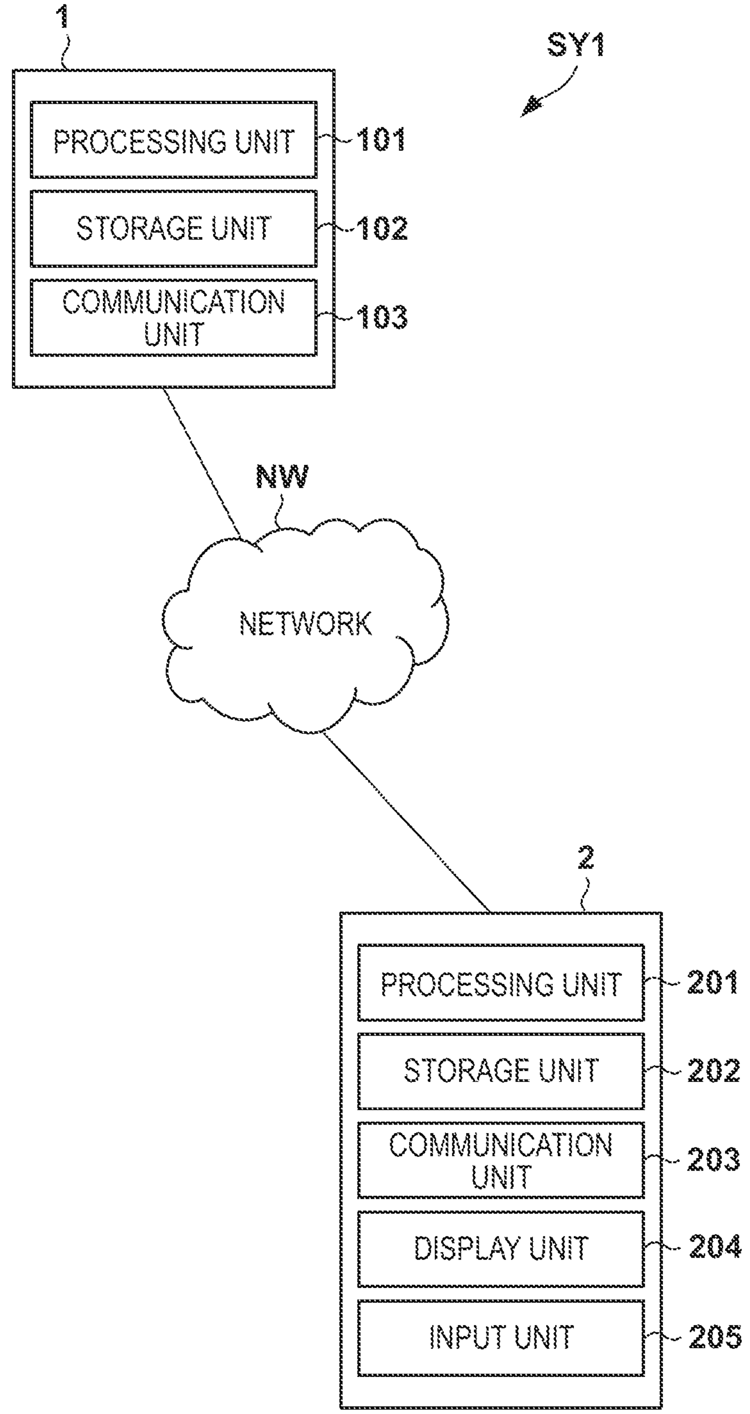
FIG. 1 is a diagram illustrating an outline of a work time prediction system according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<Outline of System>

FIG. 1 is a diagram illustrating an outline of a work time prediction system SY1 (hereinafter, referred to as the system SY1) according to an embodiment. The system SY1 is a system for predicting a time required for work when a landscaper or the like performs work such as lawn mowing or grass mowing in a park, a garden, or the like. The system SY1 includes a server device 1 and a terminal device 2. The server device 1 and the terminal device 2 are communicably provided via a network NW such as the Internet.

The server device 1 functions as a work time prediction device for predicting a time required for work. The server device 1 includes a processing unit 101, a storage unit 102, and a communication unit 103. The processing unit 101, the storage unit 102, and the communication unit 103 are connected by a bus (not illustrated). The processing unit 101 is a processor represented by a CPU, and executes a program stored in the storage unit 102 to implement various functions related to the server device 1 as the work time prediction device. The storage unit 102 is, for example, a read only memory (ROM), a random access memory (RAM), a hard disk drive (HDD), or a solid state drive (SSD), and stores various types of data in addition to the program executed by the processing unit 101. The communication unit 103 is a communication interface with an external device.

The terminal device 2 is, for example, a terminal operated by a user who performs work. The terminal device 2 may be, for example, a tablet, a smartphone, a PC, or the like. The terminal device 2 includes a processing unit 201, a storage unit 202, a communication unit 203, a display unit 204, and an input unit 205. The processing unit 201, the storage unit 202, the communication unit 203, the display unit 204, and the input unit 205 are connected by a bus (not illustrated). The processing unit 201 is a processor represented by a CPU, and executes a program stored in the storage unit 202 to implement various functions related to the terminal device 2. The storage unit 202 is, for example, a read only memory (ROM), a random access memory (RAM), a hard disk drive (HDD), or a solid state drive (SSD), and stores various types of data in addition to the program executed by the processing unit 201. The communication unit 203 is a communication interface with an external device.

The display unit 204 is a user interface that displays various types of information. For example, the display unit 204 may be a liquid crystal display, an organic EL panel, or the like. Further, the input unit 205 is a user interface that receives input from the user. For example, the input unit 205 may be a touch panel, a pointing device such as a mouse, a physical key, or the like.

Although one terminal device 2 is illustrated in FIG. 1, two or more terminal devices 2 may be configured to be able to communicate with the server device 1. Further, the server device 1 may be divided into two or more elements as necessary. That is, the server device 1 as a work time prediction device may be configured by combining a plurality of devices. In addition, at least a part of the functions implemented by the server device 1 may be implemented by a known semiconductor device such as a programmable logic device (PLD) or an application specific integrated circuit (ASIC).

<Work Area>

Figure 2:
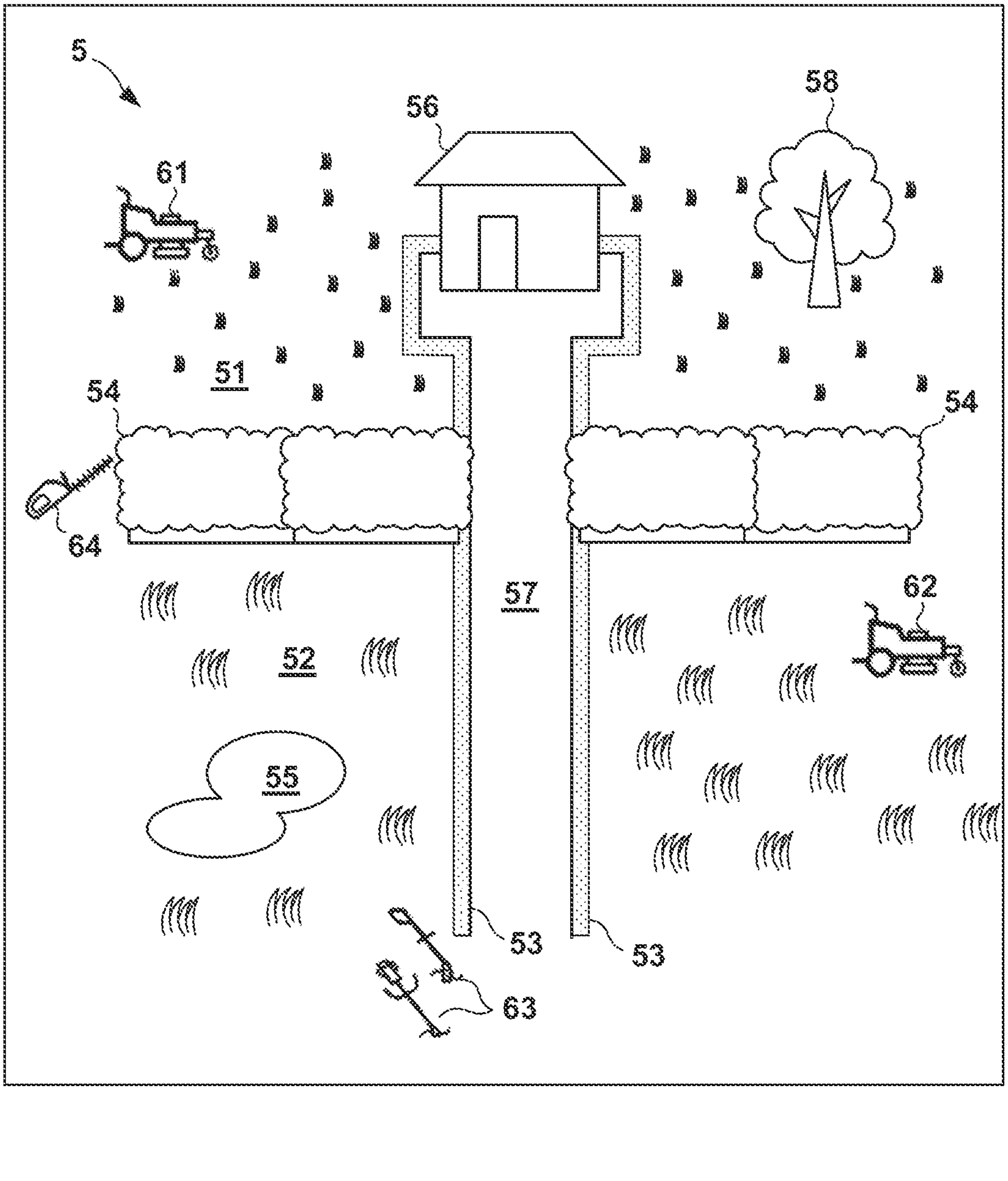
FIG. 2 is a diagram illustrating an example of a work area to be a prediction target of a work time.

FIG. 2 is a diagram illustrating an example of a work area 5 to be a prediction target of a work time. The work area 5 according to the present embodiment is divided into a lawn area 51, a grass area 52, a handheld area 53, and a hedge area 54 according to content of the work by the landscaper.

The lawn area 51 is an area where a lawn is planted. For example, the landscaper performs lawn mowing work using a ride-on lawn mower 61, a walking lawn mower (not illustrated), or the like. Alternatively, the lawn mowing work may be performed by an autonomous robot lawn mower or the like. In the present embodiment, a tree 58 is planted in the lawn area 51, and the landscaper performs the work while avoiding the tree 58 and its surroundings. That is, the tree 58 and its surrounding region are non-entry regions for a working machine.

The grass area 52 is an area where grass is growing. For example, the landscaper performs grass mowing work using a ride-on grass mower 62, a walking grass mower, or the like. Alternatively, the grass mowing work may be performed by an autonomous robot grass mower or the like. In the present embodiment, a pond 55 is arranged in the grass area 52, and the landscaper performs the work while avoiding the pond 55 and its surroundings.

The handheld area 53 is an area where the landscaper performs manual work. In the present embodiment, since the work by the ride-on lawn mower 61, the ride-on grass mower 62, or the like is difficult in a portion adjacent to a building 56 or a passage 57, the landscaper manually performs the work using a handheld working machine 63 such as an edger.

The hedge area 54 is an area where a hedge is planted. For example, the landscaper adjusts an outer shape of the hedge using a trimmer 64.

Note that the method of dividing the work area 5 is expedient according to the work content, and can be appropriately set.

<Data Configuration>

FIG. 3 is a diagram illustrating an example of data stored in the storage unit 102. In the present embodiment, a work history database 1021 is constructed in the storage unit 102, and history information regarding past works is stored therein. In the present embodiment, the history information includes information in which area information regarding past work areas is associated with time information regarding past work times. In addition, the history information includes information regarding estimations of work costs. In the present embodiment, the storage unit 102 manages and stores the history information for each work area using an area ID.

The area information regarding the past work area includes a work division, a size of the work area, and a coefficient. The work division is obtained by dividing regions in the work area according to the work performed by the landscaper. In FIG. 3, the lawn, the grass, the handheld, and the hedge are illustrated as work divisions in accordance with the work area 5 of FIG. 2.

The size of the work area is indicated for each work division. For the lawn, the grass, and the handheld, respective areas are indicated. In addition, a surface area of a portion to be a work target is indicated for the hedge. Note that the size of the hedge may be indicated by, for example, an area of a region where the hedge is planted. However, a work amount can be more appropriately grasped by representing the size of the hedge by the surface area.

The coefficient is a value multiplied by the size of the work area. In the present embodiment, each coefficient is set to a value between 1 and 2. The coefficient is used to consider not only the size of the work area but also the easiness of work in the work area in predicting the work time described later. For example, when there is an inclination in the work area or when it is necessary to perform work while avoiding a waterside of the work area, the work may take more time due to the need to reduce the movement speed of the working machine or the like. Therefore, when an element that causes an increase in the work time is present in the work area, a numerical value obtained by multiplying the size of the work area by a predetermined coefficient is used for prediction of the work time, so that the work time can be predicted in consideration of easiness of work in the work area. That is, a value of size×coefficient here can be said to be information used for prediction of the work time in consideration of easiness of work in the work area.

In the present embodiment, the area information regarding the past work area includes coefficients regarding an inclination, a waterside, an object, and a plant. That is, in a case where there is an inclination in the work area, in a case where there is a waterside, in a case where there is an object that needs to be avoided, and the like, it is considered that more time is required for work. Therefore, these factors are set as coefficients. In addition, depending on the type of plant to be cut in the work area, it is considered that more time is required for work due to reasons such as hardness and difficulty in cutting. Therefore, the type of plant is also set as a coefficient. Note that a target for which the coefficient is set is not limited to these, and can be set as appropriate.

In the present embodiment, workability information regarding the easiness of work in the work area includes coefficients related to an inclination, a waterside, an object, and a plant, but the workability information may be information other than the coefficients. For example, the workability information may be various types of information regarding workability, such as an average obliquity of the work area, an area of the waterside or the object, and an outer peripheral length of the waterside or the object. Further, for example, the workability information may be information regarding weather such as sunlight, sunlight hours, temperature, humidity, and precipitation in the work area. For example, even in the same plant, since a degree of growth varies depending on the sunlight, the precipitation, and the like, these may affect the work time. Further, for example, when it rains on the day of work or the day before work, the mud in the work area or the like may affect the work time. Therefore, the coefficients described above may be set for these pieces of information.

The time information regarding the past work time includes an actual work time, the number of workers, and the number of working machines. Further, the information regarding the estimation of the work cost includes a fuel consumption amount of the working machine and an actual cost. In the present embodiment, the time information regarding the past work time includes information regarding the work time, information regarding the number of workers, and information regarding the number of working machines for each work division.

<Control Example>

Figure 4:
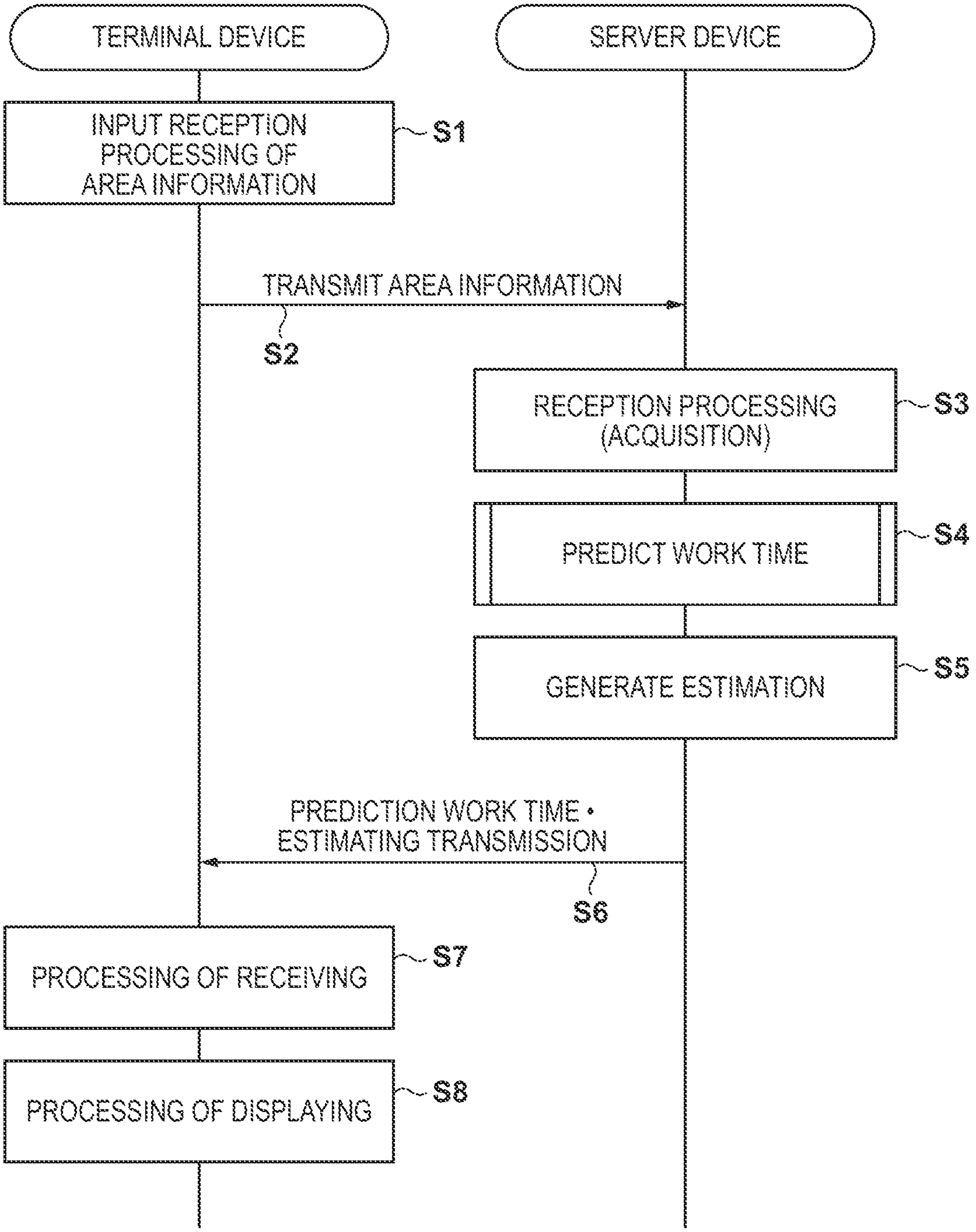
FIG. 4 is a sequence diagram illustrating a control example of a server device and a terminal device.

FIG. 4 is a sequence diagram illustrating a control example of the server device 1 and the terminal device 2. For example, this sequence is executed when the landscaper (user) predicts the work time of the work area and estimates the cost. Note that, in the following description, each step is simply denoted by S1 or the like.

In S1, the processing unit 201 executes input reception processing of area information regarding a current work area. The processing unit 201 instructs the input unit 205 to receive the user's input. Here, FIG. 5 is a diagram illustrating a screen example of the display unit 204 at the time of receiving the input of the area information. In the present embodiment, the input unit 205 receives, as the area information, input of size information regarding the size of the work area and workability information regarding easiness of work in the work area. Here, the "size" corresponds to the size information, and the "coefficient" corresponds to the workability information regarding the easiness of work.

Further, in the present embodiment, the input unit 205 can receive input of division information regarding a division of work as the area information. Then, the input unit 205 receives input of the area as the size information and the coefficient as the workability information for each division of each work. The work division may include at least one of lawn work, grass work, manual work, and hedge work. In the present embodiment, the input unit 205 receives a surface area of a work target portion as the size information for the hedge.

Further, in the present embodiment, the input unit 205 receives the number of workers for each work division and the number of work patterns for preparing an estimation as information for preparing the estimation.

Further, in the present embodiment, the workability information to be input includes information regarding the inclination of the work area, the non-entry region of the working machine in the work area, the object disposed in the work area, and the type of the plant in the work area. Specifically, the input unit 205 is configured to be able to receive coefficients of respective items. Note that the items of the coefficients to be input are not limited, and may include at least one of the exemplified items, or may include items other than the exemplified items.

In S2, the communication unit 203 transmits the area information acquired in S1 to the server device 1 on the basis of a command from the processing unit 201.

In S3, the processing unit 101 of the server device 1 executes reception processing of the area information transmitted from the terminal device 2. The processing unit 101 receives the area information transmitted from the terminal device 2 by the communication unit 103. That is, the processing unit 101 acquires area information regarding the current work area by receiving information from the terminal device 2. Moreover, the processing unit 101 acquires information input by the user to the terminal device 2 as the area information.

In S4, the processing unit 101 predicts a work time. Details of this step in which the processing unit 101 predicts the work time in the current work area on the basis of the area information acquired in S3 and the history information in which the area information regarding the past work area and the time information regarding the work time in the past work area are associated with each other will be described later.

In S5, the processing unit 101 generates an estimation of the work cost based on the work time predicted in S4. For example, the processing unit 101 calculates an estimation in consideration of the work time, the number of workers, the number of working machines, the fuel cost of the working machine, and the like for each work division.

In S6, the communication unit 103 transmits information regarding the predicted work time and the estimation on the basis of a command from the processing unit 101. That is, the processing unit 101 outputs the work time predicted in S4 and the estimation of the work cost based on the work time to the terminal device 2 via the communication unit 103. In the present embodiment, the processing unit 101 outputs an estimation of a plurality of patterns of work costs according to the number of working machines used in the current work (see FIG. 6).

In S7, the processing unit 201 of the terminal device 2 executes reception processing of the information transmitted from the server device 1. The processing unit 201 receives information regarding the predicted work time (prediction result) and the estimation transmitted from the server device 1 by the communication unit 203.

In S8, the processing unit 201 executes processing of displaying the received information. The processing unit 201 instructs the display unit 204 to display the information received in S7. FIG. 6 is a diagram illustrating a screen example of the display unit 204 related to the predicted work time and the estimation. The display unit 204 displays predicted work times (prediction results) and estimations of three patterns.

Specifically, in FIG. 6, a predicted work time and an estimation according to the number of workers and the number of working machines are illustrated for each work division, for each pattern. For example, a pattern 1 is a pattern in which work is performed with the number of workers received by the input unit 205. In addition, a pattern 2 is a pattern in which the number of workers and the number of working machines are maximally suppressed, and a pattern 3 is a pattern in which shortening of the work time is prioritized. In this way, the predicted work times and the estimations of the plurality of patterns are displayed, so that it is possible to select an appropriate pattern according to personnel allocation, availability of the working machines, and the like.

Figure 7:
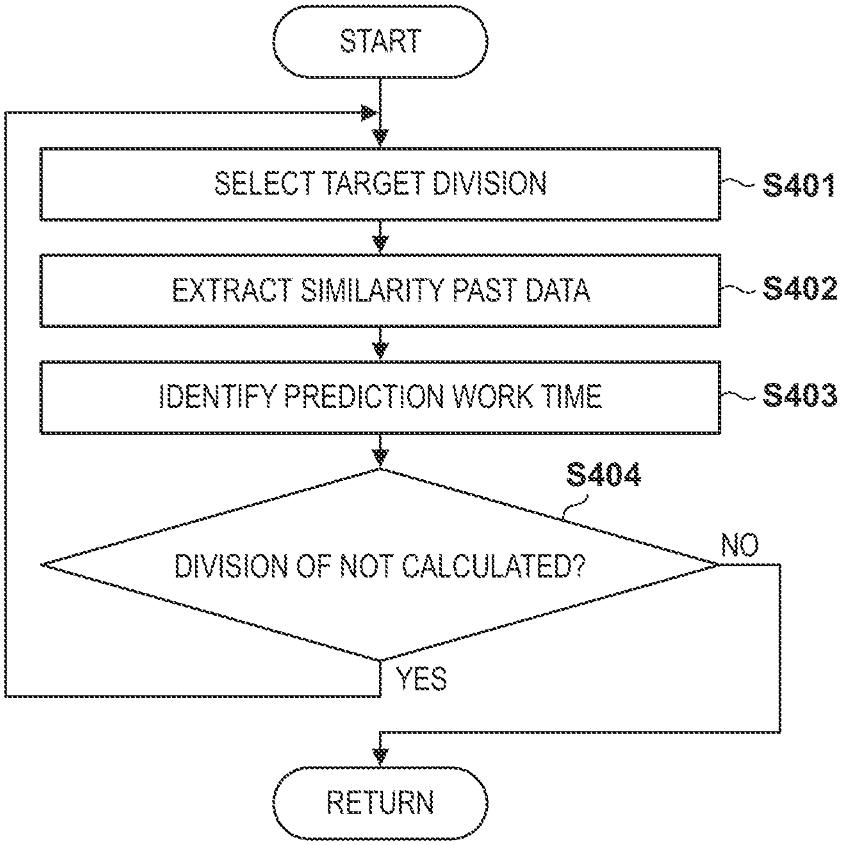
FIG. 7 is a flowchart illustrating a specific example of processing in FIG. 4.

FIG. 7 is a flowchart illustrating a specific example of step S4.

In S401, the processing unit 101 selects a prediction target division of the work time. For example, the processing unit 101 selects the lawn as the target division.

In S402, the processing unit 101 extracts data regarding a past target division similar to a current target division. FIG. 8 is a diagram illustrating past information regarding the lawn. Here, in the present embodiment, the history information is managed for each work area by the work history database 1021, but it is assumed that data of a specific work division (the lawn in the example of FIG. 8) can be extracted and used as necessary.

For example, the processing unit 101 extracts data having a division ID of A0001 as data similar to the current target division. Here, a similar data extraction method can be set as appropriate. For example, data in which items having a coefficient exceeding 1 are matched may be extracted as the similar data. In addition, data in which a difference between the items is within a predetermined value or within a predetermined ratio may be extracted as the similar data. Furthermore, data in which a difference between values of size×coefficient is within a predetermined value or within a predetermined ratio may be extracted as the similar data. In the present embodiment, the processing unit 101 extracts one piece of similar data, but the number of pieces of data to be extracted may be two or more. In this case, the processing unit 101 may previously define the number of pieces of data to be extracted, for example, 2 to 5 pieces of data, or may extract all data satisfying a predetermined condition regarding a similarity.

In S403, the processing unit 101 identifies the predicted work time. An example will be described. First, the processing unit 101 calculates a value of the size of the lawn of the current work area×the coefficient on the basis of the information received from the terminal device 2. In this example, $$450\ \text{(size)} \times 1.3\ \text{(inclination coefficient)} \times 1.4\ \text{(object coefficient)} = 819$$

is obtained. Next, the processing unit 101 predicts the work time of the lawn on the basis of the calculated value of size×coefficient and the past similar data extracted in S402. In the present example, in the past data, the value of size×coefficient is 900, the number of workers is 1, the number of working machines is 1, and the actual work time is 40 minutes. On the other hand, in the current lawn, since the value of size×coefficient is 819, and the other conditions are the same, the work time is calculated as $$40\ \text{(min)} \times (819/900) = 36.4\ \text{(min)}\ 36\ \text{(min)}$$

in consideration of a difference between values of size×coefficient.

As described above, the processing unit 101 extracts the history information of the past work area similar to the current work area, and predicts the work time in the current work area on the basis of the extracted history information. When a plurality of pieces of similar data are extracted in S402, an average value of these pieces of data may be obtained, and the current work time may be calculated on the basis of the average value.

In S404, the processing unit 101 confirms whether or not there is a division for which the predicted time is not calculated. When there is a division for which the predicted time is not calculated, the processing unit returns to S401. When there is no division for which the predicted time is not calculated, the processing unit ends the present flowchart.

As described above, according to the present embodiment, since the processing unit 101 predicts the work time in the current work area on the basis of the history information of the past work, it is possible to appropriately predict the work time.

Second Embodiment

Figure 9:
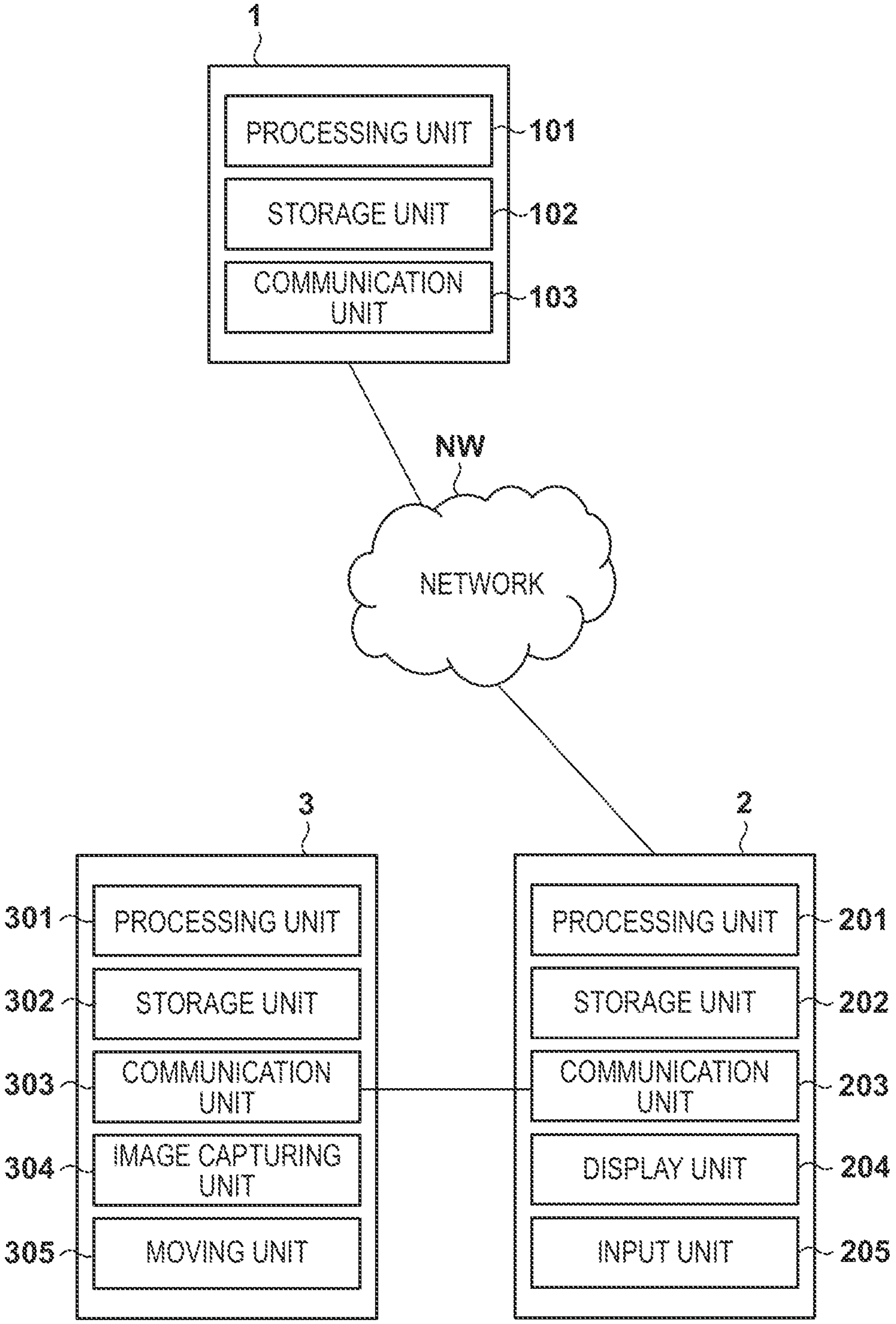
FIG. 9 is a diagram illustrating an outline of a work time prediction system according to an embodiment.

FIG. 9 is a diagram illustrating an outline of a work time prediction system SY2 (hereinafter, referred to as the system SY2) according to an embodiment. In the second embodiment, the system SY2 includes an image capturing device 3 that captures an image of a work area. Hereinafter, configurations similar to those in the first embodiment are denoted by similar reference numerals, and description thereof will be omitted.

The image capturing device 3 is a device for capturing a captured image used for prediction of a work time in the work area. The image capturing device 3 may be, for example, a flying body such as a drone, or may be configured to be able to capture an image of the work area from above. Further, for example, the image capturing device 3 may be a moving body capable of traveling on the work area. The moving body may be, for example, a working machine such as an autonomous lawn mower, and a camera for peripheral detection provided in the working machine may function as an image capturing unit 304 described later. Further, for example, the image capturing device 3 may be a monitoring camera or the like. Note that the image capturing device 3 may be possessed by a landscaper, or may be possessed by a manager or the like of the work area. Alternatively, the image capturing device 3 may be a portable terminal such as a digital camera or a smartphone possessed by a general user such as a user in the work area. The image capturing device 3 includes a processing unit 301, a storage unit 302, a communication unit 303, an image capturing unit 304, and a moving unit 305. The processing unit 301, the storage unit 302, the communication unit 303, the image capturing unit 304, and the moving unit 305 are connected by a bus (not illustrated).

The processing unit 301 is a processor represented by a CPU, and executes a program stored in the storage unit 302 to implement various functions related to a terminal device 2. The storage unit 302 is, for example, a read only memory (ROM), a random access memory (RAM), a hard disk drive (HDD), or a solid state drive (SSD), and stores various types of data in addition to the program executed by the processing unit 301. The communication unit 303 is a communication interface with an external device. The image capturing unit 304 is, for example, a camera, and is configured to be capable of capturing a still image or a moving image. The moving unit 305 moves the image capturing device 3. For example, in a case where the image capturing device 3 is a drone, the moving unit 305 can include a propeller, a motor that drives the propeller, and the like. When the image capturing device 3 is a portable terminal such as a monitoring camera or a digital camera installed in the work area, the moving unit 305 is omitted.

In the present embodiment, the image capturing device 3 can be connected to a terminal device 2 in a wired or wireless manner by the communication unit 303. For example, an image of the work area captured by the image capturing unit 304 is transmitted to the terminal device 2 by the communication unit 303. As a communication method here, known technology can be appropriately adopted, but the terminal device 2 and the image capturing device 3 may be communicable by, for example, wireless fidelity (Wi-Fi), Bluetooth (registered trademark), or the like. Alternatively, the image capturing device 3 may be able to communicate with the server device 1 or the terminal device 2 via a network NW such as the Internet. Note that, although one image capturing device 3 is illustrated in FIG. 9, two or more image capturing devices 3 may be able to communicate with the terminal device 2.

Figure 10:
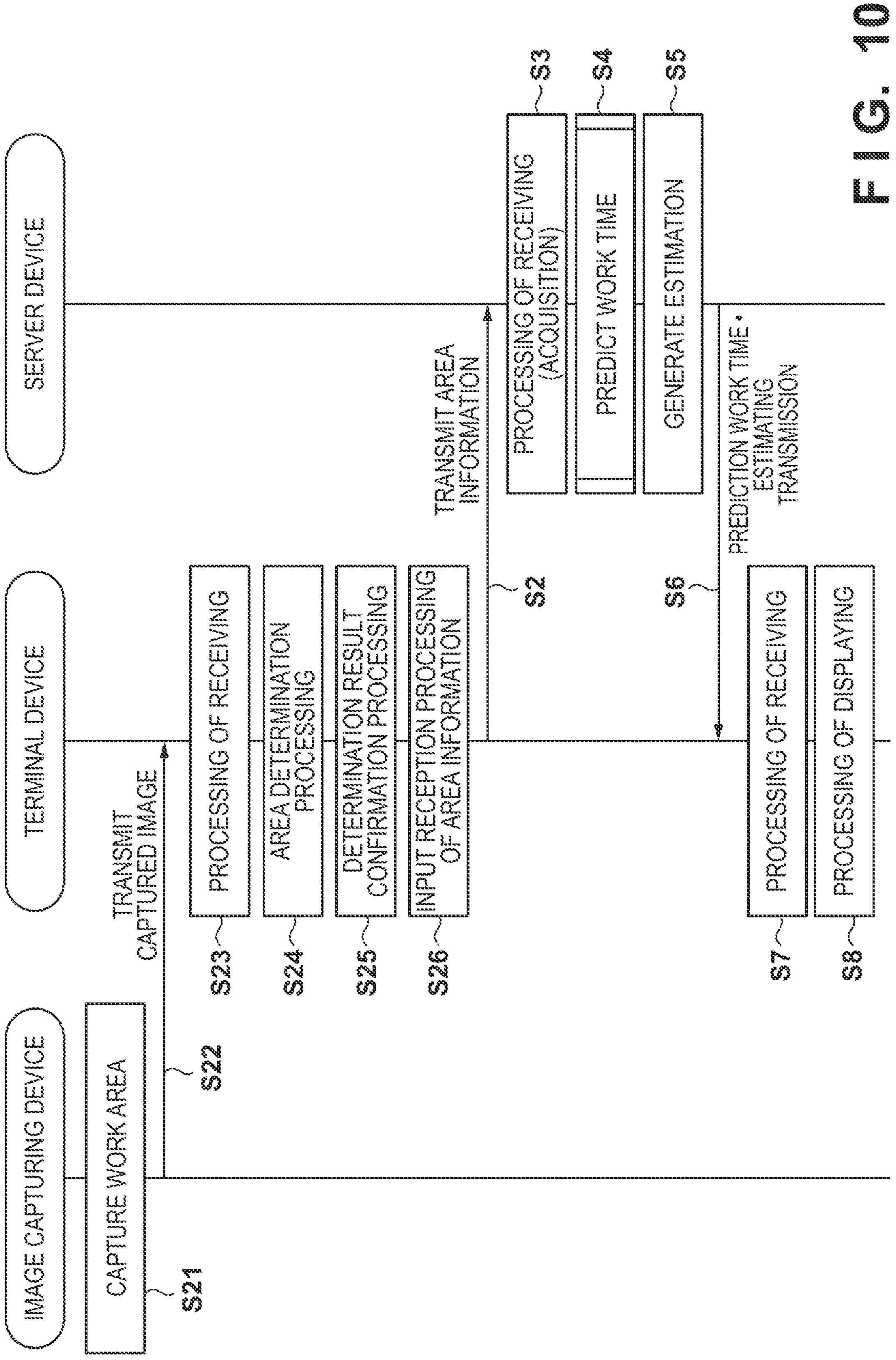
FIG. 10 is a sequence diagram illustrating a control example of a server device and a terminal device.

FIG. 10 is a sequence diagram illustrating a control example of the server device 1, the terminal device 2, and the image capturing device 3.

In S21, the processing unit 301 controls the image capturing unit 304 and the moving unit 305 to capture an image of the work area. Note that the captured image obtained in this step may be a still image or a moving image. For example, in a case where the image capturing device 3 is a drone, an autonomous lawn mower, or the like, the image capturing device 3 starts image capturing of the work area on the basis of reception of an area image capturing instruction or the like from the terminal device 2.

In S22, the communication unit 303 transmits the captured image acquired in S21 to the terminal device 2 on the basis of a command from the processing unit 301.

Note that, although the captured image is transmitted from the image capturing device 3 to the terminal device 2 in the present embodiment, the captured image may be transmitted from the image capturing device 3 to the server device 1. In this case, when the server device 1 receives a transmission request of the captured image from the terminal device 2, the server device 1 may transmit the captured image to the terminal device 2. That is, it is also possible to adopt a configuration in which the captured image of the image capturing device 3 is accumulated in the server device 1, and the terminal device 2 acquires the accumulated captured image from the server device 1 as necessary. Note that the server device 1 may transmit the captured image received from the image capturing device 3 to the terminal device 2 as it is, or may transmit the captured image to the terminal device 2 after the terminal device 2 extracts the captured image required for subsequent processing or performs predetermined image processing.

In S23, the processing unit 201 of the terminal device 2 executes processing of receiving the captured image transmitted from the image capturing device 3. The processing unit 201 receives the captured image transmitted from the image capturing device 3 by the communication unit 203.

In S24, the processing unit 201 executes area determination processing using the received captured image. This processing is processing for dividing the image-captured work area into work divisions. Known image processing technology can be appropriately adopted for the division of the work area.

Figure 11:
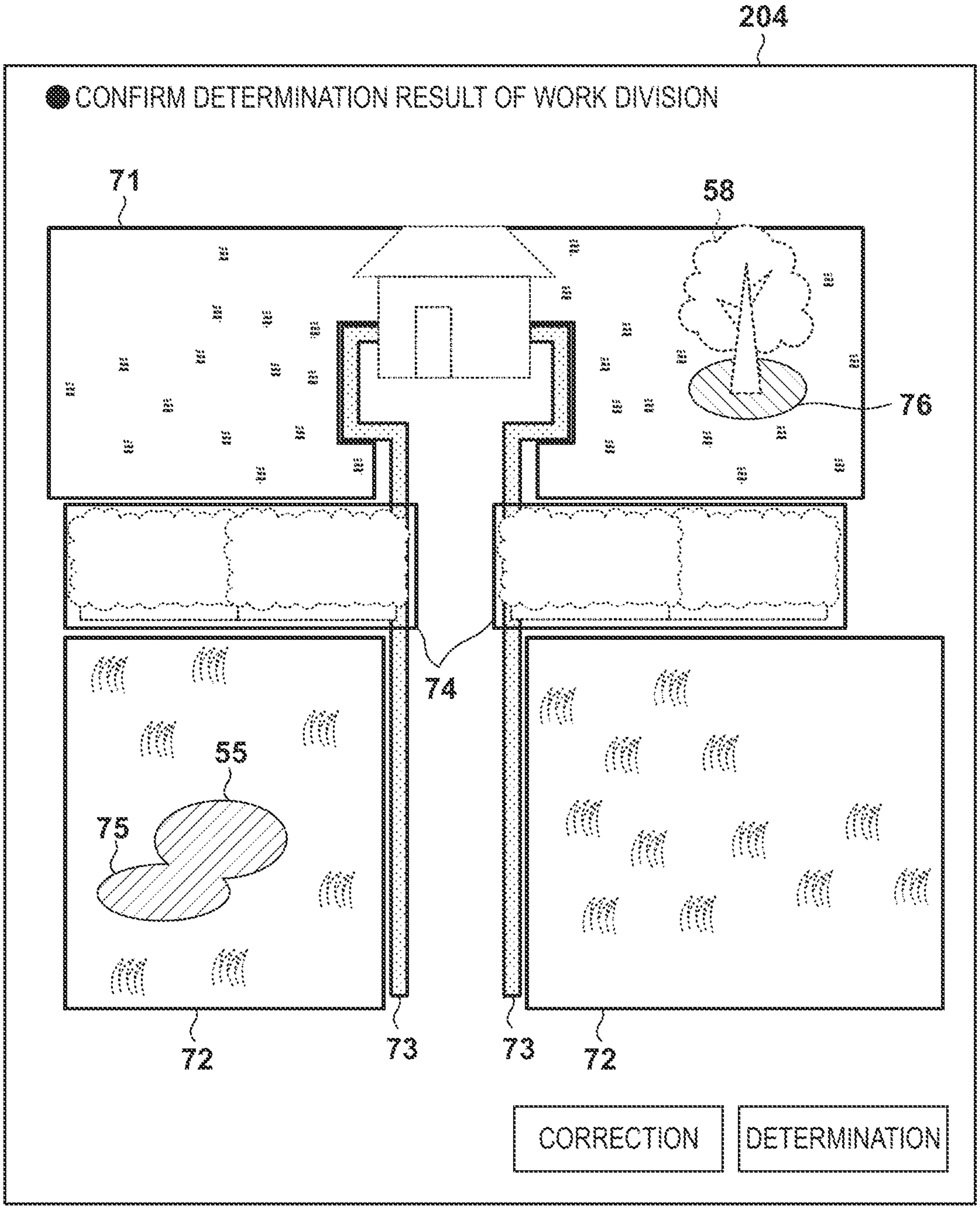
FIG. 11 is a diagram illustrating an example of a screen displayed on the display unit in determination result confirmation processing.

In S25, the processing unit 201 executes processing for confirming a determination result in S24. FIG. 11 is a diagram illustrating an example of a screen displayed on the display unit 204 in the determination result confirmation processing. In FIG. 11, the work area is divided into a lawn determination area 71 determined to be a lawn, a grass determination area 72 determined to be a grass, a handheld determination area 73 determined to be handheld, and a hedge determination area 74 determined to be a hedge, on the basis of the captured image. Further, a tree 58 and its surroundings in the lawn determination area 71 are determined as a non-entry region 76 of the working machine. Further, a pond 55 in the grass determination area 72 is determined as a waterside 75. On the basis of the confirmation screen displayed on the display unit 204, when the determination of the work area is appropriately performed, the user presses a confirmation button by the input unit 205. On the other hand, when the determination of the work area is not appropriately performed, a correction button is pressed by the input unit 205. When the correction button is pressed, the processing unit 201 may perform the area determination processing of S24 again. Alternatively, each determination region may be configured to be correctable by the user on the screen of the display unit 204.

In S26, the processing unit 201 executes area information input reception processing. FIG. 12 is a diagram illustrating a screen example of the display unit 204 at the time of receiving input of area information. In the present embodiment, numerical values in a thick frame 2041 of the screen are generated by the processing unit 201. That is, the processing unit 201 identifies a size of each of the lawn determination area 71, the grass determination area 72, the handheld determination area 73, and the hedge determination area 74 on the basis of the captured image of the image capturing device 3 and the result of the area determination processing of S24. In addition, by image processing of the captured image, an inclination, a waterside, an object to be avoided, a type of a plant, or the like in the work area is identified. In the present embodiment, since the area information is generated on the basis of the captured image of the image capturing device 3, it is possible to reduce the trouble of inputting the information by the user. In the present embodiment, the user may input the number of workers of each work division and the number of work patterns for preparing an estimation.

Since S2 and subsequent steps are similar to those in FIG. 4, description thereof is omitted. In the present embodiment, the server device 1 as the work time prediction device acquires information based on a captured image of the image capturing device 3 capable of capturing an image of the work area as area information regarding the work area. Therefore, it is possible to reduce the trouble of the user in predicting the work time.

In the present embodiment, the terminal device 2 executes the area determination processing in S24, but the server device 1 may execute the area determination processing. The server device 1 executes the area determination processing, so that it is possible to reduce the processing load on the side of the terminal device 2. In this case, in S22, the captured image of the image capturing device 3 may be transmitted to the server device 1. Then, after executing the area determination processing, the server device 1 may transmit, to the terminal device 2, information necessary for the terminal device 2 to execute the determination result confirmation processing in S25.

<First Modification of Work Time Prediction>

Figure 13:
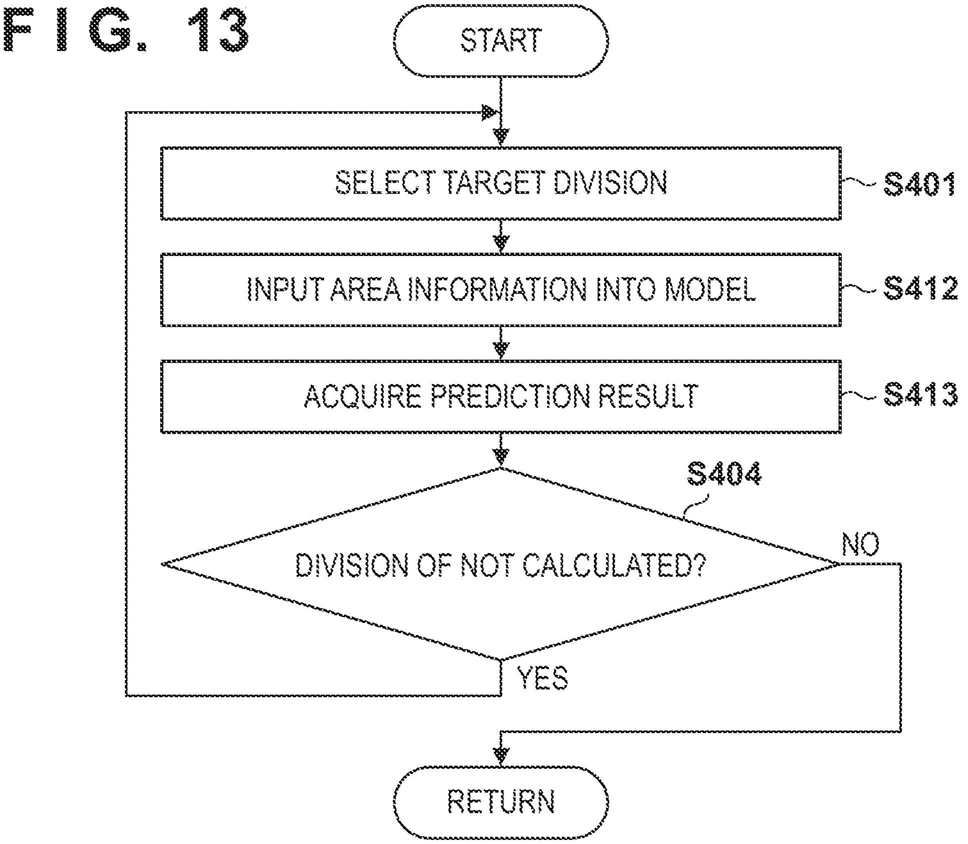
FIG. 13 is a flowchart illustrating a specific example of processing in FIG. 4.

FIG. 13 is a flowchart illustrating S4 in FIG. 4. In the present embodiment, the processing unit 101 acquires a prediction result of the work time by performing input according to area information acquired this time to a learned model that performs machine learning using history information as teacher data. That is, in executing this flowchart, a learned model using history information accumulated in the work history database 1021 is generated in advance. The learned model here is a model obtained by a machine learning method such as a convolutional neural network (CNN). Details of the learning method are omitted here, and a known method is assumed to be applicable. In the present embodiment, the learned model is generated by using teacher data in which area information (size and coefficient) regarding a past work area included in the history information is used as input data and time information regarding a past work time is used as output data. As a result, when area information of a current work area is input, a predicted work time in the current work area is output. In the present embodiment, it is assumed that a learned model is generated for each work division. Since a large load is applied to the generation of the learned model, it is assumed that the learned model is generated in advance and held in the storage unit 102 of the server device 1.

Since S401 and S404 are similar to those in the flowchart of FIG. 7, description thereof is omitted.

In S412, the processing unit 101 inputs the area information acquired from the terminal device 2 to the learned model. For example, the processing unit 101 inputs the size of the target division and each coefficient to the learned model.

In S413, the processing unit 101 acquires output of the learned model as a prediction result of the work time.

According to the present modification, the work time can be predicted more appropriately on the basis of the history information by using the learned model. Note that, in the present modification, the input data of the teacher data of the learned model is the size of the work area and the coefficient, but for example, a captured image captured by the image capturing device 3 may be used as the input data of the teacher data. That is, content of the teacher data can be set as appropriate.

<Second Modification of Work Time Prediction>

Figure 14:
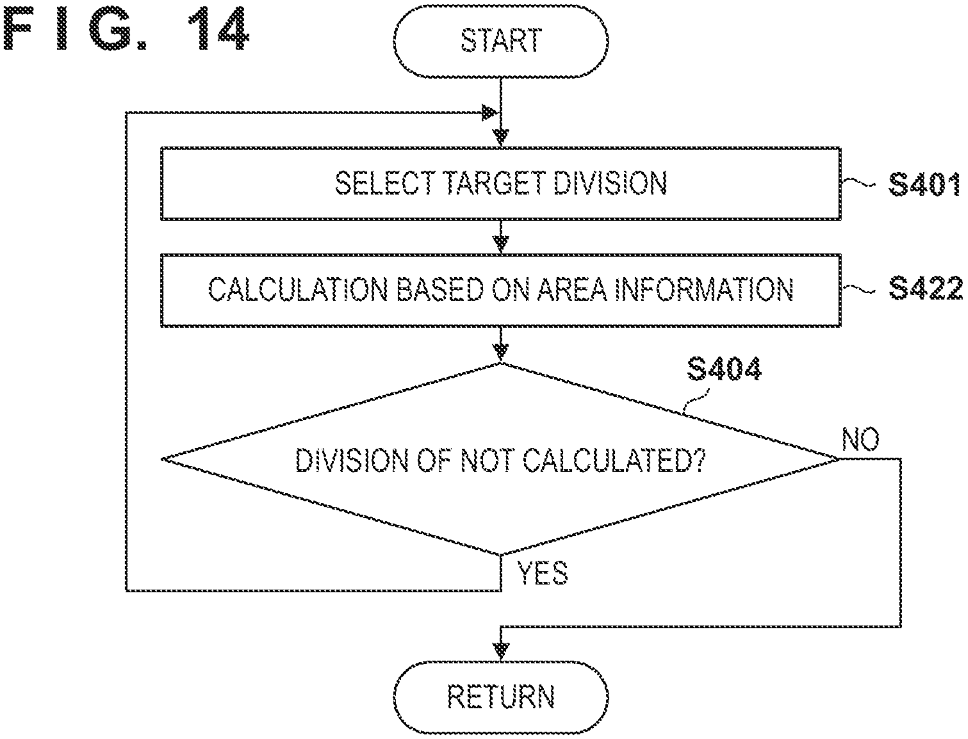
FIG. 14 is a flowchart illustrating a specific example of the processing in FIG. 4.

FIG. 14 is a flowchart illustrating S4 in FIG. 4. In the present embodiment, the processing unit 101 predicts the work time required for the work in the current work area using an arithmetic expression based on the history information accumulated in the work history database 1021. That is, in executing this flowchart, a predetermined arithmetic expression is set in advance on the basis of the history information accumulated in the work history database 1021. The arithmetic expression may be, for example, a regression expression obtained by single regression analysis using the value of size×coefficient included in the history information as an explanatory variable and using the work time as an objective variable. Alternatively, the arithmetic expression may be a regression expression obtained by multiple regression analysis using the size and each coefficient included in the history information as an explanatory variable and using the work time as an objective variable. As a specific analysis method, a known method can be adopted.

Since S401 and S404 are similar to those in the flowchart of FIG. 7, description thereof is omitted.

In S422, the processing unit 101 performs calculation based on the area information acquired from the terminal device 2. For example, the processing unit 101 acquires the predicted work time as a calculation result by putting the value of size×coefficient into the arithmetic expression.

According to the present modification, the work time can be predicted using the arithmetic expression. Further, at the time of predicting the work time, since it is not necessary to refer to the past data accumulated in the work history database 1021, it is possible to reduce the processing load.

Other Embodiments

In the above embodiment, the server device 1 functions as the work time prediction device, but the terminal device 2 may function as the work time prediction device. In this case, the terminal device 2 may acquire the information regarding the current work area by receiving the user's input by the input unit 205. Alternatively, the terminal device 2 may acquire information regarding the current work area by receiving the captured image from the image capturing device 3 and performing area determination processing or the like on the image.

Further, regarding the prediction of the work time, for example, when the terminal device 2 predicts the work time according to the flowchart illustrated in FIG. 7, the history information of the past work may be stored in the processing unit 201 of the terminal device 2. Further, for example, when the terminal device 2 predicts the work time according to the flowchart illustrated in FIG. 13, the server device 1 may generate a learned model using the information of the work history database 1021 stored in the storage unit 102, and the generated learned model may be provided to the terminal device 2. In such a case, when the information of the work history database 1021 is accumulated, the server device 1 may update the learned model and periodically provide the updated learned model to the terminal device 2. Further, for example, when the terminal device 2 predicts the work time according to the flowchart illustrated in FIG. 14, the server device 1 may acquire an arithmetic expression using the information of the work history database 1021 stored in the storage unit 102, and the acquired arithmetic expression may be provided to the terminal device 2. In such a case, when the information of the work history database 1021 is accumulated, the server device 1 may update the arithmetic expression and periodically provide the updated arithmetic expression to the terminal device 2.

In the above embodiment, the work time when the landscaper performs work such as lawn mowing or grass mowing in a park, a garden, or the like is predicted, but the configuration of the above embodiment can also be applied to prediction of other types of works. For example, the configuration of the above embodiment can also be applied to snow removal work by a snow removal machine, cultivation work by an agricultural machine, ground leveling work by a construction machine, and the like.

Summary of Embodiments

The above embodiment discloses at least the following work time prediction device, server device, terminal device, work time prediction method, and program.

1. A work time prediction device (1, for example) according to the above embodiment comprises
   - an acquisition unit (101, S3, for example) configured to acquire area information regarding a current work area; and
   - a prediction unit (101, S4, for example) configured to predict a work time in the current work area on the basis of the area information acquired by the acquisition unit and history information in which area information regarding a past work area and time information regarding a work time in the past work area are associated with each other.

According to this embodiment, since the prediction unit predicts the work time in the current work area on the basis of the history information of the past work, the work time can be appropriately predicted.

2. According to the above embodiment,
   - the area information includes size information regarding a size of the work area and workability information regarding easiness of work in the work area.

According to this embodiment, since the prediction unit predicts the work time on the basis of easiness of work in the work area, the prediction accuracy of the work time can be improved.

3. According to the above embodiment, the area information includes division information regarding a division of work, the size information includes information regarding an area for each division of the work, and the workability information includes information regarding workability for each division of the work.

According to this embodiment, since the prediction unit predicts the work time on the basis of the easiness of work for each work division, the prediction accuracy of the work time can be improved.

4. According to the above embodiment, the acquisition unit acquires information input by a user as the area information.

According to this embodiment, since the work time is predicted on the basis of the input information of the user, the work time can be predicted with a simple configuration.

5. According to the above embodiment, the acquisition unit acquires, as the area information, information based on a captured image of a device capable of capturing an image of the work area.

According to this embodiment, since the acquisition unit acquires the information based on the captured image as the area information, it is possible to reduce the trouble for the user to input the area information.

6. According to the above embodiment, the prediction unit extracts the history information of the past work area similar to the current work area, and predicts the work time in the current work area on the basis of the extracted history information.

According to this embodiment, since the history information of the past work area similar to the current work area is extracted and used for prediction of the work time, the prediction accuracy of the work time can be improved.

7. According to the above embodiment, the prediction unit acquires a prediction result of the work time by performing input according to the area information acquired by the acquisition unit to a learned model that performs machine learning using the history information as teacher data.

According to this embodiment, by using the learned model, the work time can be predicted more appropriately on the basis of the history information.

8. According to the above embodiment, the prediction unit predicts a work time required for work in the current work area using an arithmetic expression based on the history information.

According to this embodiment, since the work time is predicted by the arithmetic expression, the processing related to the prediction of the work time can be simplified.

9. According to the above embodiment, an output unit (101, S5, for example) configured to output an estimation of a work cost based on the work time predicted by the prediction unit.

According to this embodiment, since the estimation is output according to the predicted time of the work predicted by the prediction unit, it is possible to provide a highly accurate estimation to a requester of the work.

10. According to the above embodiment, the output unit outputs an estimation of the work cost of a plurality of patterns according to the number of working machines used in a current work.

According to this embodiment, an estimation of a plurality of patterns can be provided to a requester of the work.

11. According to the above embodiment, the work time prediction device further comprises a storage unit (102, for example) configured to store the history information.

According to this embodiment, the prediction unit can predict the work time on the basis of the history information stored in the storage unit.

12. According to the above embodiment, the workability information includes information regarding at least one selected from the group consisting of an inclination of the work area, a non-entry region of a working machine in the work area, an object disposed in the work area, and a type of a plant in the work area.

According to this embodiment, since the prediction unit can more appropriately grasp the easiness of the work, the prediction accuracy of the work time can be improved.

13. According to the above embodiment, the size information includes information regarding a surface area of a hedge to be a work target.

According to this embodiment, since the work amount can be more appropriately grasped, the prediction accuracy of the work time can be improved.

14. According to the above embodiment, the division of the work includes at least one selected from the group consisting of lawn work, grass work, manual work, and hedge work.

According to this embodiment, the work time can be predicted more appropriately according to the work division.

15. A server device (1, for example) according to the above embodiment functions as each unit (101, for example) of the work time prediction device according to the above 1 to 14.

According to this embodiment, a server device capable of appropriately predicting a work time is provided.

16. A terminal device (2, for example) according to the above embodiment functions as each unit (201, for example) of the work time prediction device according to the above 1 to 14.

According to this embodiment, a terminal device capable of appropriately predicting a work time is provided.

17. A terminal device according to the above embodiment comprises a transmission unit (203, for example) configured to transmit area information regarding a current work area to the server device according to the above 16;

a reception unit (203, S7, for example) configured to receive a prediction result of the prediction unit from the server device; and a display unit (204, for example) configured to display the prediction result received by the reception unit.

According to this embodiment, the prediction result of the work time in the server device can be confirmed by the terminal device.

18. A work time prediction method according to the above embodiment, comprising:

acquiring (S3, for example) area information regarding a current work area; and predicting (S4, for example) a work time in the current work area on the basis of the area information acquired in the acquiring and history information in which area information regarding a past work area and time information regarding a work time in the past work area are associated with each other.

According to this embodiment, since the prediction unit predicts the work time on the basis of easiness of work in the work area, the prediction accuracy of the work time can be improved.

19. A non-transitory computer readable storage medium storing a program according to the above embodiment causes a computer to function as:

an acquisition unit (S3, for example) configured to acquire area information regarding a current work area; and a prediction unit (S4, for example) configured to predict a work time in the current work area on the basis of the area information acquired by the acquisition unit and history information in which area information regarding a past work area and time information regarding a work time in the past work area are associated with each other.

According to this embodiment, since the prediction unit predicts the work time on the basis of easiness of work in the work area, the prediction accuracy of the work time can be improved.

20. A non-transitory computer readable storage medium storing a program according to the above embodiment is a program for causing a computer of a terminal device (2, for example) capable of communicating with a server device (1, for example) to execute a work prediction time display method, wherein the server device includes an acquisition unit (101, S3, for example) configured to acquire area information regarding a current work area, and a prediction unit (101, S4, for example) configured to predict a work time in the current work area on the basis of the area information acquired by the acquisition unit and history information in which area information regarding a past work area and time information regarding a work time in the past work area are associated with each other, and the display method includes transmitting (S2, for example) the area information regarding the current work area to the server device, receiving (S7, for example) a prediction result of the prediction unit from the server device, and displaying (S8, for example) the prediction result received in the receiving.

According to this embodiment, since the prediction unit predicts the work time on the basis of easiness of work in the work area, the prediction accuracy of the work time can be improved.

The invention is not limited to the foregoing embodiments, and various variations/changes are possible within the spirit of the invention.

According to the present invention, a work time can be appropriately predicted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A work time prediction device, comprising:

one or more processors; and a memory that stores instructions that, when executed by the one or more processors, cause the one or more processors to perform:

acquiring area information regarding a current work area; and predicting a work time in the current work area on the basis of the acquired area information and history information in which area information regarding a past work area and time information regarding a work time in the past work area are associated with each other, wherein the area information includes size information regarding a size of the work area and division information regarding a division of work, wherein the predicting comprises:

extracting, from the history information, past data corresponding to a work division matching the division of the current work area, the past data including work division data, work area size data, coefficient data, and actual work time data, calculating a workability coefficient for the current work area based on at least one measured characteristic of the current work area, the measured characteristic being obtained from sensor data or image analysis of the work area, the characteristic including at least one of an inclination, a presence of a waterside, an object disposition state, and a plant type; and predicting the work time in the current work area by executing a regression calculation in which the work area size of the current work area is multiplied by the calculated workability coefficient and applied to the extracted past data, wherein the predicted work time is output for use in determining at least one of a work schedule, an allocation of working machines, and a work cost.

2. The work time prediction device according to claim 1, wherein the area information further includes workability information regarding easiness of work in the work area.

3. The work time prediction device according to claim 2, wherein the size information includes information regarding an area for each division of the work, and the workability information includes information regarding workability for each division of the work.

4. The work time prediction device according to claim 1, wherein the acquiring acquires information input by a user as the area information.

5. The work time prediction device according to claim 1, wherein the acquiring acquires, as the area information, information based on a captured image of a device capable of capturing an image of the work area.

6. The work time prediction device according to claim 1, wherein the predicting extracts the history information of the past work area similar to the current work area, and predicts the work time in the current work area on the basis of the extracted history information.

7. The work time prediction device according to claim 1, wherein the predicting acquires a prediction result of the work time by performing input according to the acquired area information to a learned model that performs machine learning using the history information as teacher data.

8. The work time prediction device according to claim 1, the one or more processors are further caused to perform:

outputting an estimation of a work cost based on the predicted work time.

9. The work time prediction device according to claim 8, wherein the outputting outputs an estimation of the work cost of a plurality of patterns according to the number of working machines used in a planned work.

10. The work time prediction device according to claim 1, further comprising:

a storage unit configured store the history information.

11. The work time prediction device according to claim 2, wherein the workability information includes information regarding at least one selected from the group consisting of an inclination of the work area, a non-entry region of a working machine in the work area, an object disposed in the work area, and a type of a plant in the work area.

12. The work time prediction device according to claim 2, wherein the size information includes information regarding a surface area of a hedge to be a work target.

13. The work time prediction device according to claim 3, wherein the division of the work includes at least one selected from the group consisting of lawn work, grass work, manual work, and hedge work.

14. A work time prediction method, comprising:

acquiring area information regarding a current work area; and predicting a work time in the current work area on the basis of the area information acquired in the acquiring and history information in which area information regarding a past work area and time information regarding a work time in the past work area are associated with each other, wherein the area information includes size information regarding a size of the work area and division information regarding a division of work, wherein the predicting comprises:

extracting, from the history information, past data corresponding to a work division matching the division of the current work area, the past data including work division data, work area size data, coefficient data, and actual work time data, calculating a workability coefficient for the current work area based on at least one measured characteristic of the current work area, the measured characteristic being obtained from sensor data or image analysis of the work area, the characteristic including at least one of an inclination, a presence of a waterside, an object disposition state, and a plant type; and predicting the work time in the current work area by executing a regression calculation in which the work area size of the current work area, is multiplied by the calculated workability coefficient and applied to the extracted past data, wherein the predicted work time is output for use in determining at least one of a work schedule, an allocation of working machines, and a work cost.

15. A non-transitory computer readable storage medium storing a program for causing a computer to function as:

an acquisition unit configured acquire area information regarding a current work area; and a prediction unit configured predict a work time in the current work area on the basis of the area information acquired by the acquisition unit and history information in which area information regarding a past work area and time information regarding a work time in the past work area are associated with each other, wherein the area information includes size information regarding a size of the work area and division information regarding a division of work, wherein the prediction unit extracts, from the history information, past data corresponding to a work division matching the division of the current work area, the past data including work division data, work area size data, coefficient data, and actual work time data, calculates a workability coefficient for the current work area based on at least one measured characteristic of the current work area, the measured characteristic being obtained from sensor data or image analysis of the work area, the characteristic including at least one of an inclination, a presence of a waterside, an object disposition state, and a plant type; and predicts the work time in the current work area by executing a regression calculation in which the work area size of the current work area is multiplied by the calculated workability coefficient and applied to the extracted past data, wherein the predicted work time is output for use in determining at least one of a work schedule, an allocation of working machines, and a work cost.

16. A non-transitory computer readable storage medium storing a program for causing a computer of a terminal device capable of communicating with a server device to execute a work prediction time display method, wherein the server device includes one or more processors; and a memory that stores instructions that, when executed by the one or more processors, cause the one or more processors to perform:

acquiring area information regarding a current work area, and predicting a work time in the current work area on the basis of the acquired area information and history information in which area information regarding a past work area and time information regarding a work time in the past work area are associated with each other, wherein the area information includes size information regarding a size of the work area and division information regarding a division of work, wherein the predicting comprises:

extracting, from the history information, past data corresponding to a work division matching the division of the current work area, the past data including work division data, work area size data, coefficient data, and actual work time data, calculating a workability coefficient for the current work area based on at least one measured characteristic of the current work area, the measured characteristic being obtained from sensor data or image analysis of the work area, the characteristic including at least one of an inclination, a presence of a waterside, an object disposition state, and a plant type; and predicting the work time in the current work area by executing a regression calculation in which the work area size of the current work area is multiplied by the calculated workability coefficient and applied to the extracted past data, wherein the predicted work time is output for use in determining at least one of a work schedule, an allocation of working machines, and a work cost, and the display method includes transmitting the area information regarding the current work area to the server device, receiving a prediction result of the prediction from the server device, and displaying the prediction result received in the receiving.

17. The work time prediction device according to claim 1, wherein the predicting predicts a work time required for work in the work area in which the work is planned using an arithmetic expression based on the history information, wherein the arithmetic expression is a regression expression obtained by regression analysis using values that are based on the history information as an explanatory variable and an objective variable.

18. The work time prediction device according to claim 1, wherein when a plurality of past data corresponding to the matching work division are extracted, the predicting predicts the work time in the current work area based on an average value derived from the plurality of past data.

19. The work time prediction device according to claim 17, wherein the area information includes division information regarding a division of work, the arithmetic expression is a regression expression obtained by obtained by single regression analysis or multiple regression analysis using values of the size of each division and each coefficient which is multiplied by the size included in the history information as an explanatory variable and using the work time as an objective variable.

20. The work time prediction device according to claim 19, further comprising an input unit configured to receive a user input of the values of the coefficients.

* * * * *